Aug. 4, 1959  E. C. JOHNSON  2,897,682
VARIABLE SPEED DRIVE
Filed May 11, 1956  2 Sheets-Sheet 1
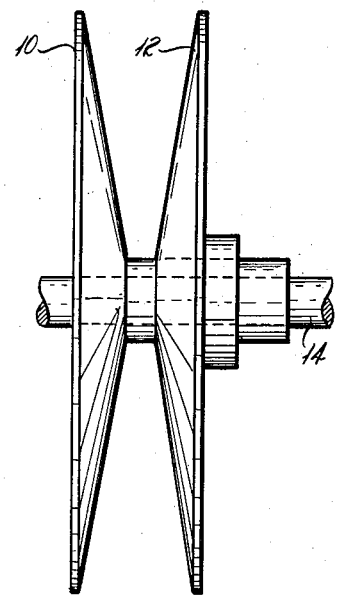
Fig.1
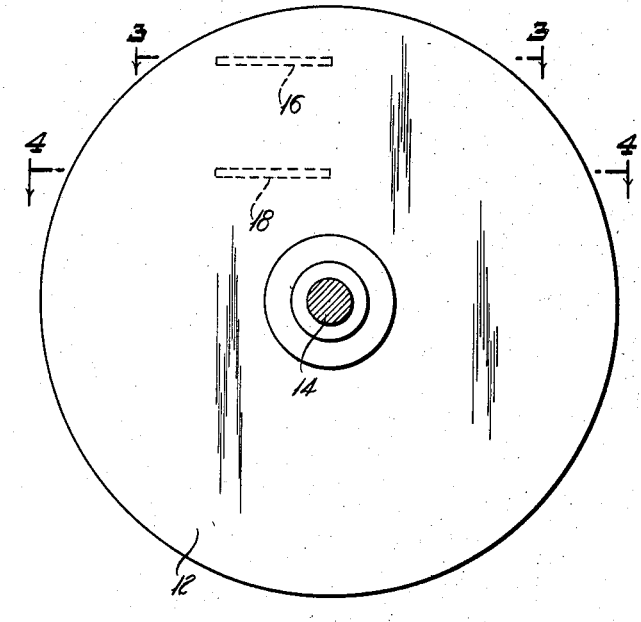
Fig.2
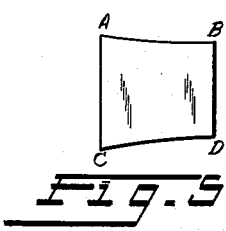
Fig.5
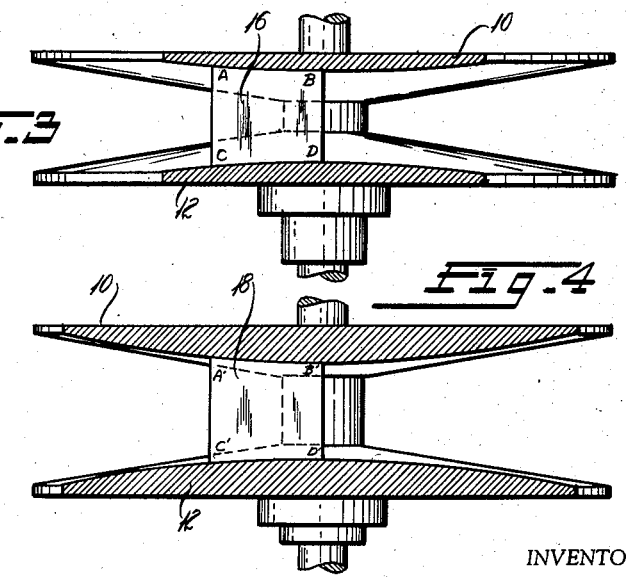
Fig.3
Fig.4
INVENTOR
Edmund C. Johnson
BY
Diggins & G. Blanc
ATTORNEYS Aug. 4, 1959 — E. C. JOHNSON — 2,897,682
VARIABLE SPEED DRIVE
Filed May 11, 1956 — 2 Sheets-Sheet 2
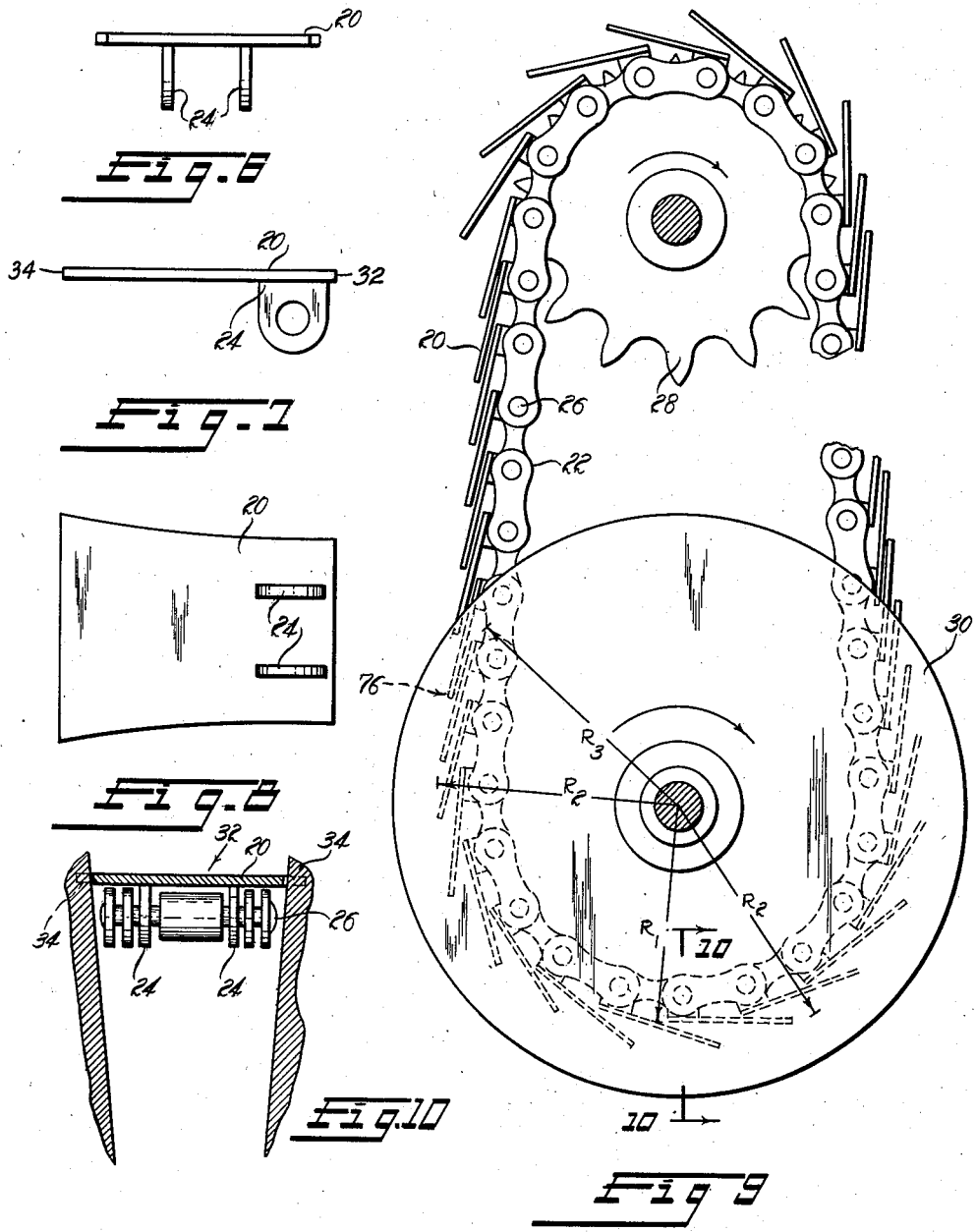
INVENTOR
EDMUND C. JOHNSON
BY
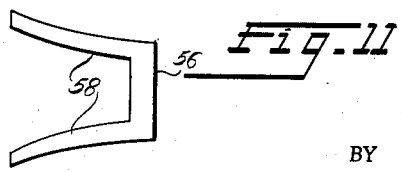
ATTORNEYS United States Patent Office 2,897,682
Patented Aug. 4, 1959

2,897,682

VARIABLE SPEED DRIVE

Edmund C. Johnson, Granville, Ohio

Application May 11, 1956, Serial No. 584,269

7 Claims. (Cl. 74—230.17)

This invention relates to a transmission belt or chain and more particularly relates to a chain or belt for use with and to positively drive variable pitch cone type sheaves.

Variable speed drives utilizing V belts and variable pitch sheaves are well known and find widespread usage in industry. Friction is depended upon to transmit force from the V belt to the driven sheave. Thus, if a V belt is considered to be of infinitesimally small thickness, it would have line contact with the inner faces of the driven sheave and the two planes in which the line contact arcs lie would be parallel. No positive mechanical engagement or lock is thus possible between the belt and the sheave. Rather, rotation of the driven sheave is dependent upon the friction force which acts to prevent slip of the belt between the two sheave surfaces. A V belt of finite thickness is nothing more than a number of infinitesimally thin flat belts of increasing width, concentrically grouped and acting as one belt. For a given size of V belt and sheave, the power transmitted is limited by the amount of friction that can be brought into play. Various articulated modifications of the simple V belt have been proposed and a certain number of these have found usage. Basically, however, all of these more complex transmission belts operate on the same principle and because of the multiplicity of and the irregularity of motion of the individual parts, are ill suited for use in high speed machinery.

It is accordingly a primary object of this invention to provide an improved transmission belt which transmits force to the driven sheave by mechanical engagement of the transmission belt with the driven sheave through a locking wedging action rather than by application of frictional force.

It is another object of the invention to provide an improved mechanical or articulated transmission belt capable of use at high speeds and power, with cone sheaves.

It is another object of the invention to provide a driving medium or element for a variable speed transmission through which a mechanical linkage is maintained between the input and output shafts.

It is another object of the invention to provide an improved transmission belt which may be mechanically driven and which in turn mechanically engages and turns a driven sheave.

These and further objects and advantages of the invention will become apparent upon reference to the following specification, claims and drawings wherein:

Figure 1 is an end view of a variable pitch sheave;

Figure 2 is a side view of the variable pitch sheave of Figure 1;

Figure 3 is a horizontal section of the variable pitch sheave of Figure 2 taken along the line 3—3 of Figure 2;

Figure 4 is a horizontal section of the variable pitch sheave of Figure 2 taken along the line 4—4 of Figure 2;

Figure 5 is a plan view of the basic shape of a wedge plate or keystone plate as used in the invention;

Figures 6, 7 and 8 are views of a keystone plate fabricated to be used with a roller chain and cone shaped sheaves, the combination of a plurality of plates and the roller chain, being one of several possible transmission belt assemblies, and one which is described herein for illustrative purposes;

Figure 9 is a view of a transmission belt assembly constructed according to the invention as noted above, connecting a driving sprocket to a driven variable pitch sheave;

Figure 10 is a cross sectional view of the transmission belt assembly as noted above taken along the line 10—10 of Figure 9, and illustrates the mechanical engagement of the belt with a cone pulley; and Figure 11 is a skeletonized plan view of the basic shape of the keystone plate, relieved in the middle to allow conformation of the plate shape to the sheave with which it will engage.

Referring to Figure 1 there is shown a common type of variable pitch sheave consisting of sheave cones 10 and 12 which are mounted upon a shaft 14 and which are provided with a conventional means for varying the pitch, not shown. It will be understood by those skilled in the art that the two cones 10 and 12 are capable of axial adjustment toward and away from one another even when the sheave is turning. Referring to Figures 2 and 3, if a horizontal cross section of the sheave is taken along the line 3—3, the intersections of the section plane with the conical surfaces of the sheave cones 10 and 12 between the lines AC and BD generate curved lines which converge toward a vertical plane which includes the axis of the shaft and is perpendicular to the section plane. Similarly the horizontal section plane corresponding to line 4—4 in Figure 2 generates curved lines between the lines A'C' and B'D' which also converge toward a vertical plane which includes the axis of the shaft and which is perpendicular to the section plane. In both Figures 3 and 4 the length of line B—D is equal to the length of line B'D' and this line is made to fit between the cones 10 and 12 in both figures by moving the cones away from each other in Figure 4. The areas ABDC and A'B'D'C' are of the same general shape, i.e., a keystone shape, but are not quite identical. However, if the area A'B'D'C' in Figure 4 which has line contact with cones 10 and 12 is moved radially outward as the sheave cones 10 and 12 are moved together axially, it is found that substantially line contact exists between points C'D' and A'B' and that the area is parallel to its position as shown in Figure 4. In other words, an area of the type shown in Figure 5 with curved sides AB and CD will lie in any radial position in the sheave as shown at 16 and 18 in Figure 2 and will maintain at least point contact with the inner surface of the sheave cones at 4 points while remaining perpendicular to a vertical plane which includes the axis of the shaft in Figure 2.

I have found that if a plate of the type shown in Figure 5 is associated with a pair of sheave cones in the manner shown in Figure 2 and is restrained from outward radial movement, a force applied to the plate from left to right tends to lock or wedge the plate between the converging surfaces of the sheave cones, as shown in the horizontal cross section of Figures 3 and 4, so as to tend to rotate the sheave and shaft to which it is attached.

Referring to Figure 9 there is shown one embodiment of my invention wherein locking plates or keystone plates 20 are attached to an endless roller type chain 22 in the form of a closed loop. Thus referring to Figures 6–8 there will be seen that the plates 20 are provided with depending arms 24 which are carried by the pins 26 of chain 22. In the particular application shown in Figure 9 the chain is driven by means of a sprocket 28 and drives a pulley or sheave 30. The feed ratio between the sprocket 28 and pulley 30 may be varied by changing the effective pitch diameter of the sheave 30 by moving the sheave cones toward or away from one another and providing some conventional means for taking up the slack in the chain.

Referring to Figure 10 and noting the position of the leading edge 32 and trailing edge 34 of the plate the locking action is apparent. Thus in Figure 9 it will be seen that when the plate is in a locked or engaged position the leading and trailing edges of the plate are respectively at radii of R1 and R2. As a plate becomes disengaged its leading edge is moved out by the chain to which it is attached so that it has a radial position of R3. In the locked position the plates are held from moving outward and in fact are forced radially inwardly by the tension of the chain.

While a chain type belt has been shown in connection with the foregoing description of the invention it will be apparent that other types of chains or mechanically driven belts may be utilized and that the plates may be attached thereto in a variety of manners. The plates may be made of any material possessing adequate rigidity, such as metal, rubber, etc. The plates may also be skeletonized in shape as shown in Figure 11, wherein a plate 56 having a keystone outer shape is cut out at 58 to allow the edges of the plate a degree of resiliency to closely follow the pulley contour.

It will be apparent from the foregoing that I have provided a novel transmission belt for cone type sheaves utilizing a plurality of keystone shaped plates which exercise a wedging action on the sheave and which do not rely solely on friction as a driving force.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A drive assembly comprising a toothed wheel, a variable pitch cone sheave, an articulated chain mating with and driven by said toothed wheel and passing around said sheave, and a plurality of keystone shaped locking members having one end thereof attached to said chain and the other end free, said free ends being of a greater width than said connected ends whereby said members drive said sheave through positive locking engagement.

2. A drive assembly as set out in claim 1 wherein the free ends of said members are free to pivot about axes parallel to the transverse axes of said chain.

3. A drive assembly as set out in claim 2 wherein said members are flat and wherein said axes lie in a common plane when said chain defines a straight line.

4. A drive assembly as set out in claim 3 wherein said sides of said members are arcuate.

5. A transmission drive element comprising an elongated flexible loop member and a plurality of flat members each having one end thereof attached to said loop member parallel to a transverse axis of said loop member and the other end thereof free to pivot about said attached end, said attached ends lying in a common plane when said loop member defines a straight line, with said free end of each flat member overlying the attached end of the member adjacent it, said flat members having arcuate sides converging towards said loop member, the spacing between said sides at the free end of said flat members being greater than the spacing of said sides at the attached end of said flat members.

6. A transmission assembly including a flexible loop member and a double cone sheave, said flexible loop member passing around the axis of said sheave between the cones thereof and in spaced relation thereto, and a plurality of locking members in contact with said sheave and having one end thereof attached to said loop member and the other end thereof free to move toward and away from said loop member, said locking members having sides converging towards said attached end thereof whereby said sides contact said cones, said sides at said attached end contacting said cones at a first radius thereof, and said sides at said free ends contacting said cones at a second radius thereof greater than said first radius.

7. An endless transmission member in the form of a closed loop and including a plurality of connected plates attached at positions spaced along the longitudinal axis of said member, each plate having first and second edges transverse to said axis and being attached adjacent said first edge to said member, each plate having said second edge extending outside said closed loop and being free to move toward and away from said member, said first edge of each plate having a smaller width than said second edge thereof.

References Cited in the file of this patent

UNITED STATES PATENTS

| | | |
|---|---|---|
| 1,435,737 | Reeves | Nov. 14, 1922 |
| 2,079,351 | Judelshon | May 4, 1937 |

FOREIGN PATENTS

| | | |
|---|---|---|
| 490,597 | Canada | Feb. 17, 1953 |